Jan. 20, 1942.     H. M. BACH     2,270,243
FREQUENCY DEVIATION METER
Filed Oct. 19, 1940     4 Sheets-Sheet 1

INVENTOR
HENRY M. BACH
BY
ATTORNEY

Jan. 20, 1942.   H. M. BACH   2,270,243
FREQUENCY DEVIATION METER
Filed Oct. 19, 1940   4 Sheets-Sheet 2

INVENTOR
HENRY M. BACH
BY
ATTORNEY

Jan. 20, 1942.   H. M. BACH   2,270,243
FREQUENCY DEVIATION METER
Filed Oct. 19, 1940   4 Sheets-Sheet 4

INVENTOR
HENRY M. BACH
BY
ATTORNEY

Patented Jan. 20, 1942

2,270,243

UNITED STATES PATENT OFFICE 2,270,243

FREQUENCY DEVIATION METER

Henry M. Bach, Woodmere, N. Y., assignor to Radio Patents Corporation, a corporation of New York Application October 19, 1940, Serial No. 361,981

13 Claims. (Cl. 172—245)

The present invention relates to frequency variation response circuits or frequency deviation meters for indicating the departure of the frequency of both an alternating voltage and of the tuning or resonant frequency of an electric circuit or network from a determined frequency and/or for producing electrical energy having an amplitude varying proportionately to said frequency departure.

There arises frequently the problem in practice to measure the frequency deviation of an oscillator from its assigned frequency. This problem is met with for instance in radio transmitters wherein it is necessary for the frequency of the transmitter to be held within certain limits of an assigned carrier frequency. In such a case it is desirable to have an indicator or meter showing the deviation of the transmitter frequency from its assigned value at any time which meter is usually direct reading and calibrated in cycles of frequency deviation. The same problem is met with in frequency modulated transmitters wherein it is necessary to hold the mean or central frequency to its assigned value and in which case it is further required to provide a frequency responsive system which not only will show a slow departure due to drift of the oscillator frequency but which will also supply a correcting voltage to be applied to a frequency determining element of the oscillator in order to compensate for any initial frequency departure.

Other uses for frequency deviation meters or response circuits are in measuring equipment wherein an oscillator is returned to some predetermined frequency as for example in a capacitance meter or condenser analyzer of the substitution type or wherein a direct reading of capacity or inductance values on a calibrated scale is desirable.

Accordingly, an object of the present invention is to provide an improved frequency deviation meter of new and novel design which will enable visual indication of the frequency departure of an oscillator from a predetermined value.

A further object is to provide a frequency deviation meter whose sensitivity is substantially higher than that of any known met in the art and may be varied over wide limits.

A further object is the provision of a frequency deviation meter which in addition to providing visual indication of the frequency departure of an oscillator from a predetermined frequency will provide a controlling potential whose magnitude and sign is a function of the extent and sense, respectively, of the frequency departure.

A specific object is to provide a condenser analyzer capable of measuring capacitance values of the order of 1-100 mmfd. and less.

A further object is the provision of a capacity meter having a direct reading scale for use in capacity testing and which is capable of indicating the departure of capacitance in percentage from an assigned standard.

Another object is to provide means in connection with a frequency variation response circuit embodying an electron discharge tube, the direct output current of which varies in dependence upon the frequency departure being determined whereby the steady or constant output current of the tube and variations thereof due to causes other than said frequency departure are substantially balanced.

These and further objects of the invention will become more apparent from the following detailed description taken with reference to the accompanying drawings forming part of this specification and wherein.

Like reference numerals identify like parts throughout the different views in the drawings.

One type of frequency deviation meter known in the art employs the zero beat method whereby a frequency departure of an oscillator to be measured is combined with a fixed standard frequency to cause a change in beat frequency. This change in beat frequency is converted into a corresponding change in voltage impressed upon a suitable meter or indicating instrument. Another type of known frequency deviation meter employs a frequency discriminator adapted to change a frequency shift into a corresponding phase shift which in turn is converted into an amplitude indicated by a suitable meter. An inherent drawback of this type of discriminator is the fact that its stability is dependent upon the stability of a coil and condenser combination serving as a phase shifting means which is inherently unstable. Moreover, the sensitivity of such a discriminator is a function of the Q-value of the coil-condenser combination used. As this Q-value has a definite upper limit the sensitivity of the meter is also limited.

The frequency deviation meter proposed by the present invention utilizes a special type of discriminator circuit in which the phase shifting element advantageously has the form of a piezoelectric quartz crystal or an equivalent resonating device. Since the stability of a quartz crystal may be made extremely high and the Q-value of the crystal may likewise be made substantially higher than that of any other type of resonant impedance means, it will be seen that such a discriminator is capable of greater precision and accuracy than any one of the types known in the art.

Figure 1:
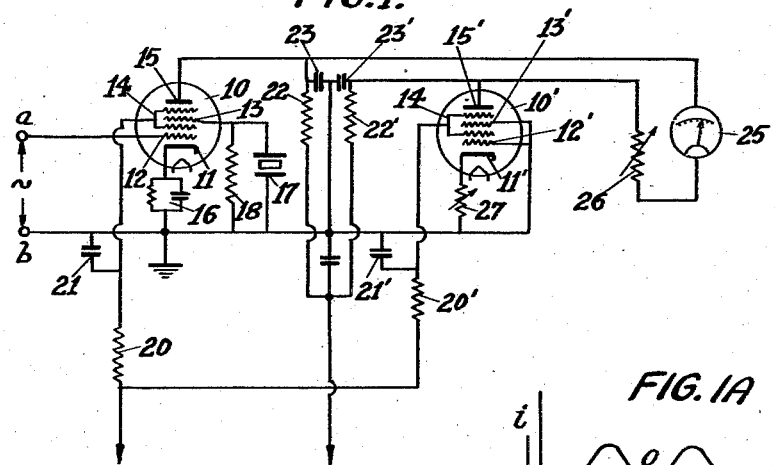
Figure 1 is a basic circuit diagram of a frequency deviation meter or response circuit embodying the principles of the invention.

Referring more particularly to Figure 1, there is shown a simple diagram of a frequency deviation meter constructed in accordance with the principles of the invention. An input voltage having a predetermined frequency and supplied by a suitable source is impressed by way of terminals $a$—$b$ upon the first control grid 12 and cathode 11 of a hexode type electron discharge tube 10. This tube comprises further, in the order named, a second control grid 13, a screen or acceleration grid 14 located between the grids 12 and 13 and preferably extending over the other side of the grid 13 as shown, and an anode or plate 15. The cathode 11 is suitably biased by means of a condenser-resistor network 16 inserted in the common return for the grid and plate circuits in a manner well known in electron tube circuits. A steady positive potential is applied to the screen 14 from a suitable high tension source indicated by the plus sign through a voltage drop or bleeder resistance 20 and the screen grid 14 is by-passed to ground for alternating potential by a condenser 21 in a manner well understood. The control grid 13 is connected to ground through a piezo-electric crystal 17 by-passed for direct current by a resistor 18 which may be replaced by a choke coil. The plate 15 is connected to the positive side of a high tension source indicated by the plus sign through a load resistor 22 and by-passed for alternating potential to ground by means of condenser 23. The crystal 17 is ground to the resonant frequency of the input voltage or a harmonic of the latter.

In an arrangement afore-described, electrons emitted from the cathode 11 are accelerated by the positive screen 14 in such a manner that a portion of the total electron current will flow to the plate 15 while the greater part of the electrons will form a concentrated space charge or virtual cathode in the vicinity of the accelerating grid 13. The input potential applied to the grid 12 modulates the electron stream whereby the density of the virtual cathode or space charge will also vary in the rhythm of the input voltage. This variable space charge in the vicinity of grid 13 will cause a displacement current to flow from the grid 13 through its external circuit to the cathode. This displacement current is due to the well known fact that, if an electrical charge such as a concentrated electron space charge in a vacuum tube has its charge density or distance from a conducting body such as a grid in a tube in the present case varied, a current will be produced by electrostatic induction in a circuit connecting the charge with said body, the induced current being proportional to the rate of change of the charge density or distance variations. Thus, in the present case where the space charge adjacent to the grid 13 varied substantially in phase with a sinusoidal input potential impressed upon grid 12, the induced displacement current in the external circuit of grid 13 will vary according to the derivative of the sine function, that is, according to a cosine function, or in other words, the induced current will lag by 90° behind the space charge variations or the impressed input signal potential upon the grid 12. As a result of the displacement current in the external circuit of grid 13, a voltage will be developed across the crystal 17. If the input potential is of the same frequency as the parallel resonant frequency of the crystal 17, the latter will offer pure ohmic resistance to the current flowing through it. Accordingly, therefore, the voltage developed on grid 13 will be in phase with the induced current and hence the voltages on the grids 12 and 13 will be in quadrature to each other. If the frequency of the input voltage differs from the frequency of the quartz crystal, the voltage developed across the crystal will either lead or lag the current through the crystal in such a manner that for relatively large departures of the input oscillations from the resonant frequency of the crystal the voltage developed on grid 13 will be either in phase or 180° out of phase with respect to the input voltage depending upon the sense of the frequency departure. Over a narrow band of operating frequencies about the resonant frequency of the crystal it will be found that the phase of the voltage developed on grid 13 will vary very rapidly and substantially linearly in one or the other direction from the normal 90° phase position in proportion to and in accordance with the sense of the frequency departure of the input voltage from the resonant frequency of the crystal.

The total plate current $I_p$ drawn by the tube 10 is substantially given by the following formula:

$$I_p = I_0 + A_1 e_1 + A_2 e_2 + K e_1 e_2$$

Figure 1A:
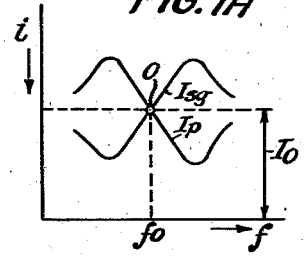
Figure 1A is a diagram explanatory of the function of the circuit shown in Figure 1.

The first term $I_0$ represents the steady or quiescent plate current which will be balanced in a manner described later, $e_1$ is the control potential upon the first grip 12, $e_2$ is the control potential upon the second grid 13, while $A_1$, $A_2$ and $K$ are proportionately constants. The second and third terms $A_1 e_1$ and $A_2 e_2$ are alternating current terms which however are not developed across the plate impedance due to the condenser 23 which effectively makes the plate load impedance equal to zero for alternating currents. The third term $K e_1 e_2$ contains an alternating component of twice the input frequency and a further term including an additional direct current component superimposed upon the steady or quiescent direct current $I_0$. The latter is the only term which will be developed across the plate load impedance comprised of the resistor 22 and by-pass condenser 23. The magnitude of the additional direct current varies in sign and amplitude as a function of the relative phase departure between the potentials on the control grids 12 and 13 from the normal 90° value, that is in turn as a function of the frequency departure of the impressed voltage from the resonant frequency of the crystal 17, as will be understood from the above. If the frequency of the impressed oscillations is equal to the resonant frequency of the crystal, the phase relation between the potentials on the control grids 12 and 13 will be equal to 90° resulting in an additional direct current component in the plate current equal to zero. If the impressed frequency deviates from the resonant frequency of the crystal, the additional direct current will increase in either direction from zero proportionately to and depending on the sense of the frequency deviation. Thus, referring to the diagram shown in Figure 1A representing the relation between the output current $i$ and the input frequency $f$ and assuming that no input potential is impressed upon the grid 12, it will be found that the steady or quiescent plate current will have a value $I_0$ depending on the tube characteristics and operating potentials. If, now, an alternating input potential is applied to the grid 12 having a frequency $f$ equal to the resonating frequency $f_0$ of the crystal 17, the latter will offer pure ohmic resistance to the displacement current and accordingly the potential developed upon the grid 13 will be 90° out of phase with the potential upon the grid 12. Consequently, the quiescent or steady plate current will have the same value $I_0$ as if no input signal were applied to the tube. On the other hand, if the impressed input signal has a frequency which is higher than the resonating frequency $f_0$ of the crystal, the latter will offer capacitative impedance to the displacement current, thus causing the potential developed upon the grid 13 to oppose the potential on grid 12 and resulting in an increase of the additional direct plate current in a negative direction or a decrease of the total steady plate current $I_p$. Vice versa, if the input frequency becomes less than the resonating frequency of the crystal, the latter will offer inductive impedance to the displacement current, resulting in an increase of the additional direct plate current in a positive direction or an increase of the total steady plate current $I_p$. The change of the steady plate current as a function of the input frequency is shown by the curve $I_p$ in Figure 1A. The screen grid current undergoes a variation similar but in reverse relation to the plate current as a function of the input frequency as shown by the curve $I_{sg}$ representing the steady current through the screen grid circuit.

The tube 10' being similar to tube 10, with corresponding parts thereof and its associated circuit elements designated by like primed numerals, serves to balance out the steady plate current $I_0$ from the measuring instrument or meter 25 and also to balance or suppress variations due to power supply fluctuations and other causes. For this purpose tube 10' is preferably of the same type as tube 10. The plate resistance 22' of this tube equals the plate resistance 22 of tube 10. Moreover, tube 10' is adjusted so that its steady plate current flowing through resistance 22' is equal to the steady or quiescent plate current $I_0$ of the tube 10 flowing through resistance 22. Hence, at the plates of tube 10 and of tube 10' there will be established the same potential provided no input voltage is impressed upon the tube 10. The meter 25 connected between the plates 15 and 15' of the tubes is a zero center type microammeter and has an adjustable series resistance 26 connected therewith thus providing a volt meter whose full scale deflection for a given input voltage will be inversely related to the magnitude of the resistance 26. Item 27 is an adjustable resistor in the cathode return lead of tube 10' for adjusting the grid bias and in turn the steady plate current through the plate resistance 22'. The control grids 12' and 13' of tube 10' are tied together and connected to ground so that the plate current of tube 10' may be varied by varying the value of resistance 27 which will effectively change its grid bias.

In operation either the cathode resistance 27 or the screen grid resistance 20' or any other suitable control element is varied until the meter 25 indicates zero voltage difference between the two plates 15 and 15'. An alternating input voltage is then impressed upon the tube 10 by way of terminals $a$—$b$ and the frequency of the impressed potential varied until the meter 25 goes through the following cycle as will be understood by reference to Figure 1A. At first, the meter will deviate in one direction to a certain positive maximum and then return quickly to zero and deviate in the other direction to a negative maximum and return again to zero. The correct central point 0, that is the point where the frequency of the impressed potential is equal to the resonant frequency of the crystal is at the frequency where the meter 25 reads zero on the way from one maximum to the other maximum deflection. With the frequency of the oscillator set in this manner a deviation will cause a corresponding change in the meter deflection to one or the other side from the center or zero position dependent upon the sense and magnitude of departure of the impressed frequency from the resonant frequency of the quartz crystal.

If it is not possible or practical to have the crystal at the same frequency as the desired frequency of the impressed potential a suitable heterodyning means may be provided in the form of an auxiliary variable oscillator and a mixer which together will convert the impressed frequency to a frequency equal to the frequency of the quartz crystal. The sensitivity of the system may be adjusted by varying the pressure or the clamping force of the crystal electrodes or in any other suitable manner known to vary the Q-value of the crystal. Likewise, by reducing the value of the resistance 18 serving to provide a direct current return of the grid 13 to the cathode, the effective Q-value of the crystal may also be reduced. The sensitivity may likewise be controlled by varying the resistance 26 in series with the meter 25.

Figure 2:
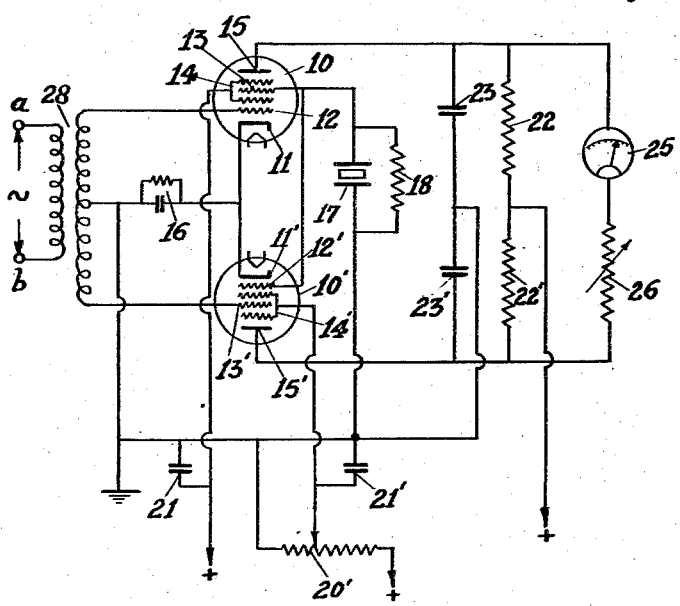
Figures 2 to 4 show modifications of a meter or system of the type shown in Figure 1.

Figure 2 shows a modified diagram for a frequency deviation meter according to the invention for balancing out the steady plate current. According to this modification, the voltage impressed by way of terminals $a$—$b$ is developed across the center tapped secondary of a transformer 28 in such a manner that alternating potentials 180° out of phase are applied to the two input grids of the tubes 10 and 10'. However, in this case, the input grid of tube 10' is the third grid 13', that is the second control grid remote from the cathode rather than the first control grid near the cathode. As a result of the interchange of grids 12' and 13' the quadrature current developed in the return circuit of grid 12' will be in an opposite direction to the direction it would be if the grids were not reversed. Feeding the two input grids in opposite phase, therefore, will cause the potentials on the two phase shifting grids 12' and 13 to have the same phase thereby resulting in a voltage being developed across the quartz crystal 17 connected to both the grids 12' and 13 on the one hand and to both the cathodes 11 and 11' on the other hand, the phase of this voltage being a function of the frequency departure of the impressed voltage from the resonant frequency of the crystal.

As pointed out, in a circuit according to Figure 1, if the input potential is impressed upon the second control grid remote from the cathode and the resonant impedance or quartz crystal is connected to the first control grid near the cathode, a frequency departure of the input voltage will cause a change in plate current in an opposite sense to that if the grids are connected as shown in the drawing. In other words, if a certain frequency departure causes an increase in plate current in Figure 1, it will cause a decrease in plate current if the control grids are interchanged (interchange of curves $I_p$ and $I_{sg}$ in Figure 1A). Accordingly, therefore, a differential or push-pull voltage will be developed between the plates 15 and 15' of the tubes 10 and 10' of Figure 2. The steady or quiescent plate currents of the two tubes are balanced by adjusting the variable screen potential by means of an adjustable resistor 20' or in any other suitable manner. In this case the zero center type meter 25 will read zero. As the impressed potential is varied about the resonant frequency of the quartz crystal 17, meter deflections will be obtained in a manner similar to that according to Figure 1 but with much greater amplitude due to the differential or push-pull action of this circuit.

Figure 3:
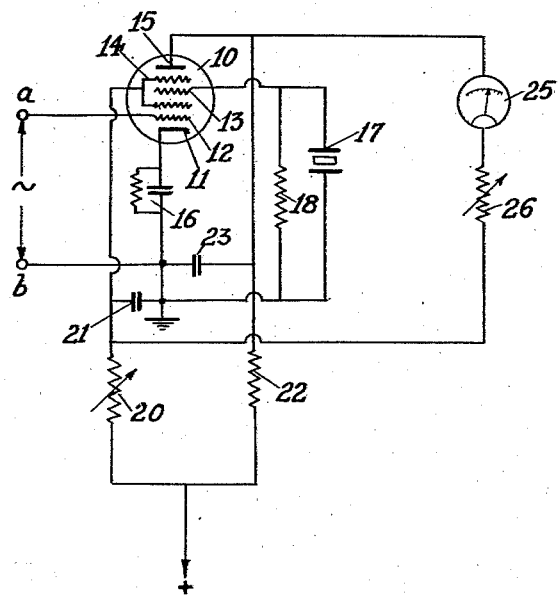

Figure 3 shows a system similar to Figure 2 employing a single tube wherein the quiescent plate current is suppressed from the meter by means of the screen current as described in the following. The steady screen current develops a voltage drop across resistance 20 while the steady plate current develops a voltage drop across resistance 22. These voltage drops are balanced by properly adjusting resistance 20. A change in plate current due to the input voltage varying in frequency with respect to the resonant frequency of the quartz crystal is accompanied by an opposite change in screen current as explained hereinabove with reference to Figure 1A. Accordingly, therefore, the meter 25 will record the difference in the voltage drops through the plate and screen resistances 20 and 22, respectively. By suitably choosing the values of these resistances and the operating point of the tube, the system may be designed to substantially eliminate variations due to power supply changes or changes in tube characteristics and other component parts of the system.

Looked at from another angle, Figure 3 represents a Wheatstone bridge circuit with the resistance 20 and the screen-to-cathode impedance forming one bridge arm and resistance 22 and the plate-to-cathode impedance representing the other arm of the bridge. The anode potential source is connected between one pair of diagonal points or apices of the bridge while the meter 25 in series with resistance 26 is connected between the remaining pair of apices or diagonal bridge points. From this is also seen that the effect of changes due to variations in the power supply or tube constants upon the meter are substantially neutralized provided the bridge circuit is properly balanced.

Figure 4:
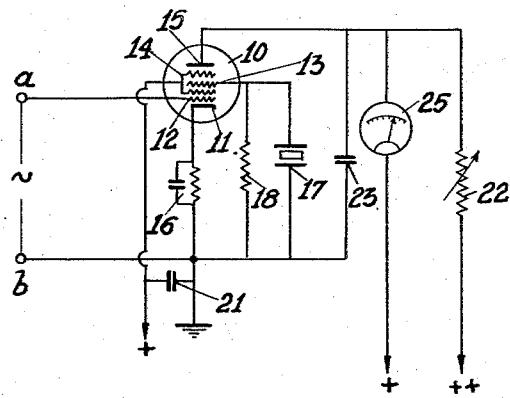

Figure 4 shows a modification of the invention wherein steady plate current flowing through the meter 25 is balanced by means of the series resistance 22 which is connected to a higher potential point of the plate current supply source than the point to which the meter is connected. The steady current flowing through the meter 25 to the plate of the tube is thus balanced out by means of an equal and opposite current flowing through the resistance 22 and through the meter in the opposite sense to the steady plate current and returning by way of the power supply source.

Figure 5:
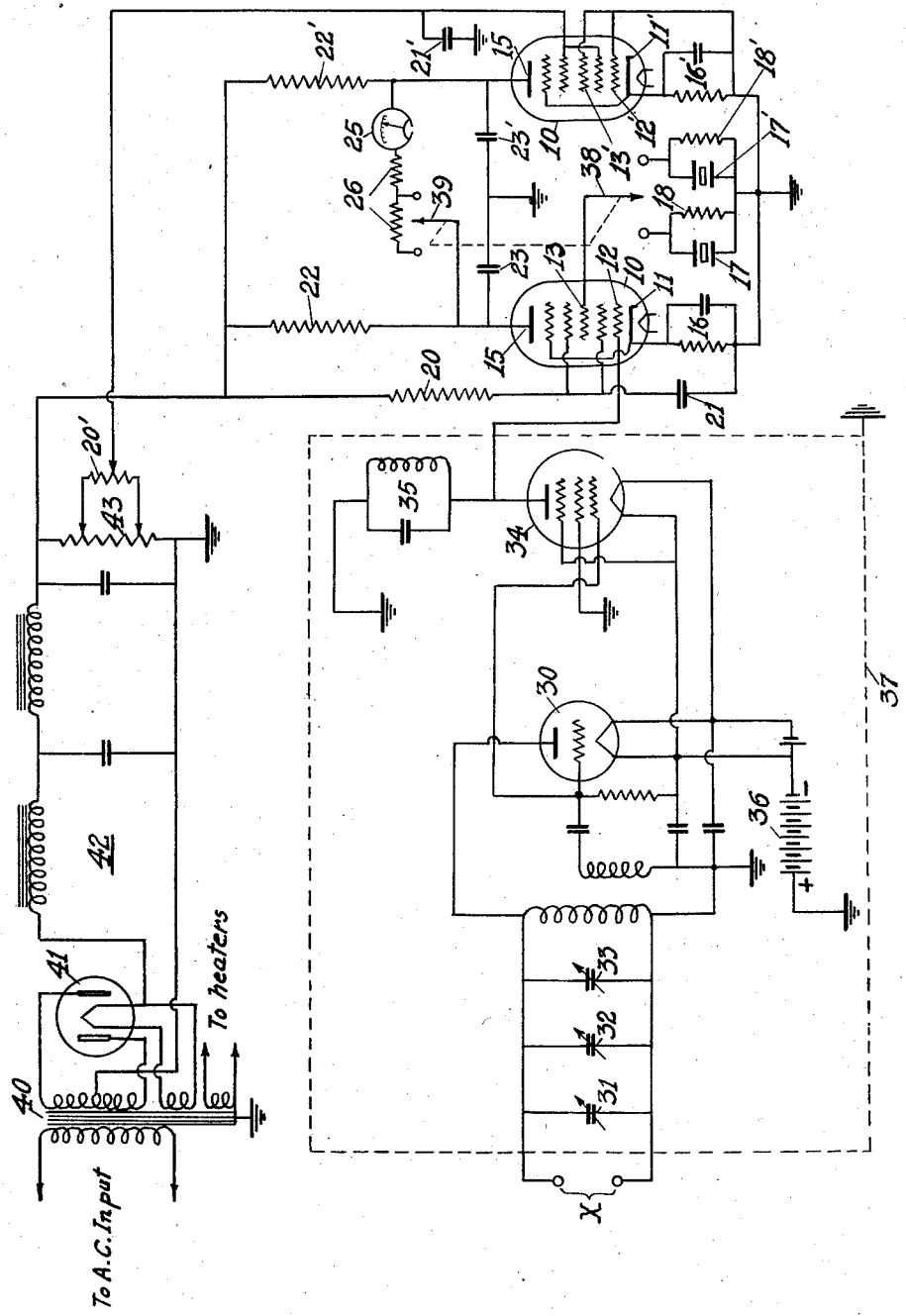
Figure 5 is a complete circuit diagram of a practical embodiment of a device according to the invention designed for use as a condenser analyzer.

Referring to Figure 5, there is shown a practical circuit embodying the principles of the invention as applied to a capacity analyzer. A triode oscillator 30 of the tuned plate type is employed as a signal source because of its high inherent stability. The tank circuit of the oscillator comprises an accurately calibrated and highly stable condenser 31, such as a 500 mmfd. condenser as used in the apparatus built by applicant. Condenser 31 is shunted by a zero adjusting condenser 32 of approximately 10 mmfd. as well as an auxiliary trimmer condenser 33 also of 10 mmfd. capacity. The tank coil of the oscillator is designed to tune to the frequency of the quartz crystal 17 or 17', respectively, with the capacities 31, 32, 33 set to a maximum. The output of the oscillator is fed into a buffer amplifier stage 34 having a tuned output circuit 35 and serving to isolate the oscillator from the frequency deviation meter and to prevent undesirable inter-locking or pulling effects of the oscillator. The positive potential of the oscillator power supply shown as a battery 36 is grounded and the negative potential is operated below ground in order to remove any direct current potential difference between the shield or chassis 37 and the unknown condenser to be connected between terminals X shunting the oscillator tank circuit. This system of power supply is likewise advantageous in that it eliminates a great number of by-pass condensers and resistors. The output of the buffer stage 34 is fed into the frequency deviation meter constructed substantially like Figure 1, but with several practical modifications to improve the operation and enhance the flexibility of the device. Two crystals 17 and 17' are provided associated with a switch 38 whereby either crystal may be employed. One of the crystals is rigidly clamped or otherwise modified so as to have a substantially lower Q-value, such as about ½ to 1/10 of the "Q" of the crystal to reduce the sensitivity of the instrument for routine checking. The zero adjustment of the system is accomplished by adjusting the screen potential of the "idler" tube 10' in a manner substantially as described in connection with the preceding circuits. The unknown condenser is connected between the terminals X after the system has been balanced and the capacity of the condenser 31 is decreased until the meter indicates that the oscillator has been returned to its former frequency in which case the meter 25 connected between the plates of tubes 10 and 10' is at its zero or center position. The dial on the condenser 31 is calibrated in a reversed sense, that is such that it shows zero capacity when the condenser is set at its maximum and shows maximum capacity when the condenser is set at zero and inasmuch as this condenser may have 500 divisions full scale, the dial will read directly the unknown capacity in mmfds. i. e. with one scale division representing 1 mmfd. The vernier condenser 32 of 10 mmfd. operates in exactly the same manner and may be read directly on the scale to a tenth mmfd. per division and estimated to better than one part in a 25th of 1 mmfd. The meter 25 has in series therewith a resistor 26, a portion of which may be disconnected by switch 39 which is preferably ganged with the switch 38 for the crystals 17 and 17' as indicated by dotted lines to switch over from the high sensitivity range to the low sensitivity range and vice versa. The power supply shown is of standard design for operation from an A. C. network and comprises an input transformer 40, a double diode rectifier 41, smoothing filter 42, and voltage divider resistance 43.

Figure 6:
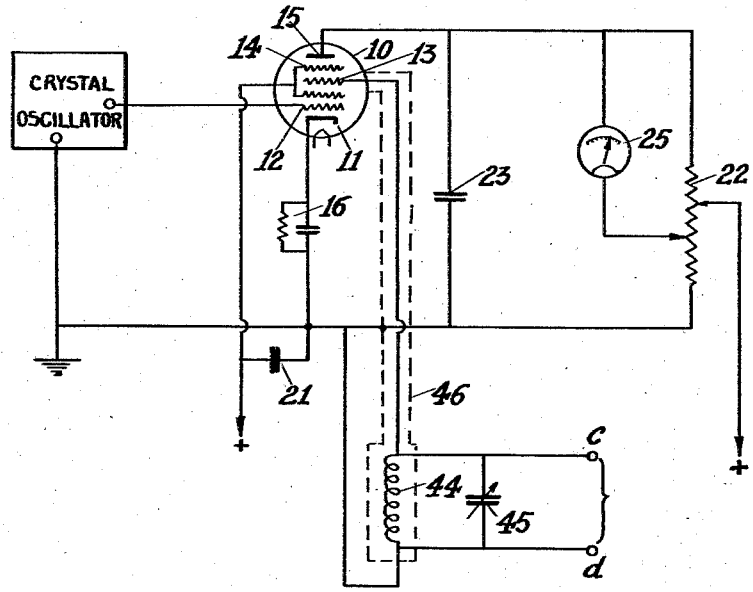
Figures 6 and 7 are diagrams showing modifications of the device shown in Figure 5.

Figure 6 shows a further modification wherein the crystal is replaced by a resonant impedance means in the form of a parallel tuned circuit comprising an inductance coil 44 shunted by a condenser 45, the former being shielded by a metallic screen 46 from the remaining parts of the system. The resonant frequency of the circuit 44, 45 is varied and the input frequency supplied by a crystal oscillator or the like is held at a fixed value. This is particularly useful in condenser measurement wherein great accuracy is not required. To obtain high sensitivity it has been found that a de-damping circuit of known design comprising a feedback amplifier having critical positive and negative feedback may be connected across the coil 44 to increase its Q-value. The condenser whose capacity is to be checked or measured is connected between the terminals c—d across the tuned circuit 44, 45. The balancing of the steady plate current in Figure 6 is obtained by placing the plate load resistance 22 between the plate 15 and ground and connecting the high tension supply and one terminal of the meter 25 to suitable points of the resistance 22 in a manner similar to that as shown in Figure 4.

Figure 7:
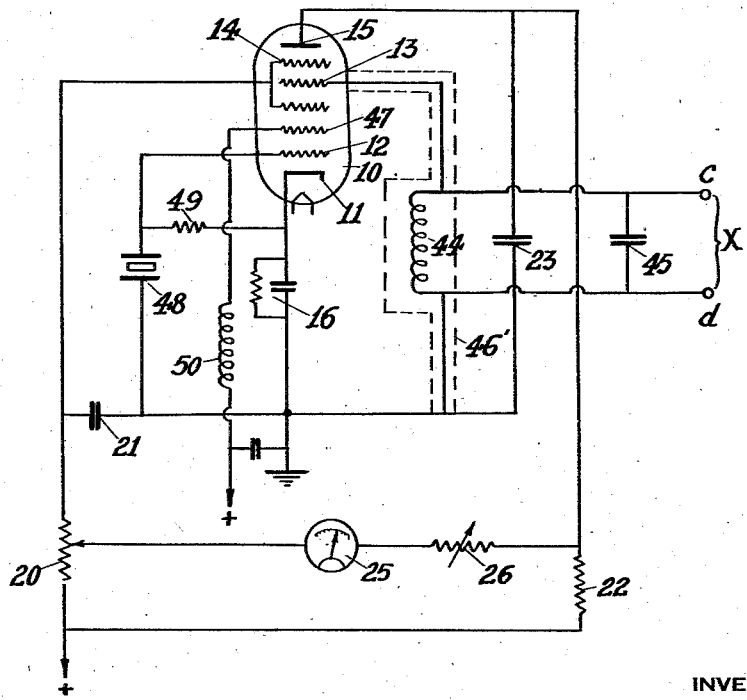

Figure 7 is substantially similar to Figure 6 with the exception that the crystal oscillator is structurally incorporated in the same electron tube. For this purpose, tube 10 is provided with an additional grid 47 located adjacent to the control grid 12 and connected in the example shown to a power supply source through a high frequency inductance coil 50. A crystal 48 and cathode return resistance 49 are connected to the grid 12 and cathode or ground in accordance with well known practice whereby the crystal will be maintained in oscillating condition and the electron stream emitted from the cathode 11 will be modulated in accordance with the frequency of the crystal. A phase shifted potential will be developed on the grid 13 depending on the resonant frequency of the tuned circuit 44, 45, i. e. depending in turn on the unkown capacity connected between c—d, resulting in a corresponding direct current through the meter 25 varying in proportion to the departure of the frequency of the tuned circuits from the crystal frequency.

Although the invention has been illustrated in the form of a frequency deviation meter or capacity analyzer, it will be evident that the circuits disclosed may be used with equal advantage as a discriminator for supplying a voltage varying in proportion to the relative frequency departure of an alternating voltage from a determined frequency by providing a suitable load impedance in the form of an ohmic resistance or the like in the plate circuit of the tube adapted to develop a frequency discriminating voltage for use in automatic frequency or tuning control, for demodulating a frequency modulated radio signal or for any other purpose.

It will be further evident from the foregoing that the invention is not limited to the specific circuits and arrangements of parts shown and disclosed herein for illustration, but that the underlying novel principle will be susceptible of numerous variations and modifications coming within the broader scope and spirit of the invention as defined in the appended claims.

The specification and drawings are according to be regarded in an illustrative rather than in a limiting sense.

I claim:

1. A frequency variation response circuit comprising a source of alternating potential, an electron discharge tube having a cathode and an anode, a source of space current connected to said cathode and anode for producing an electron discharge stream through said tube, control means including circuit connections from said first source to said tube for varying said electron stream in accordance with said alternating potential, a control grid in said tube, resonant impedance means connected between said control grid and cathode, the relative frequency of said alternating potential with respect to the resonant frequency of said impedance means being variable, means for exciting said control grid by said alternating potential substantially by space charge coupling of said grid with the electron stream, an output circuit connected to said anode, response means in said output circuit for utilizing anode current variations in response to the relative frequency departure of said alternating potential from the resonant frequency of said impedance means, and means energized by said space current source for producing a current through said response means to compensate the steady anode current therethrough.

2. A frequency variation response circuit comprising a source of alternating potential, an electron discharge tube having a cathode and an anode, a source of space current connected to said cathode and anode for producing an electron discharge stream through said tube, control means including circuit connections from said first source to said tube for varying said electron stream in accordance with said alternating potential, a control grid in said tube, resonant impedance means connected between said control grid and said cathode, the relative frequency of said alternating potential with respect to the resonant frequency of said impedance means being variable, means for exciting said control grid by said alternating potential substantially by space charge coupling of said grid with the electron stream, a further electron discharge tube similar to said first tube and energized by said space current source to produce an electron stream therethrough, load impedance means in the anode circuits of said tubes whereby the potentials at both anodes due to steady anode current are equalized, and further means connected between the anodes of said tubes being responsive to current variations as a result of a frequency departure of said alternating potential from the resonant frequency of said impedance means.

3. A frequency deviation meter comprising a source of alternating potential, an electron discharge tube having a cathode and an anode, a source of space current connected to said cathode and anode for producing an electron discharge stream through said tube, a first control grid in said tube near said cathode, a second control grid in said tube, an acceleration grid located between said first and second control grids, means for maintaining said acceleration grid at a steady positive potential with respect to said cathode to produce a concentrated electron space charge adjacent to said second control grid, means for impressing alternating potential from said first source upon said first control grid, resonant impedance means connected between said second control grid and cathode, whereby said second control grid is excited by said alternating potential substantially by electron coupling with said space charge, the relative frequency of said alternating potential with respect to the resonant frequency of said impedance means being variable, an output circuit connected to said anode and cathode, a direct current measuring instrument inserted in said output circuit, and means energized by said space current source for balancing the steady anode current through said instrument.

4. A frequency deviation meter comprising a source of alternating potential, an electron discharge tube having a cathode and an anode, a first control grid near said cathode, a second control grid near said anode and an acceleration grid located between said first and second control grids, a source of space current connected to said cathode and anode for producing an electron discharge stream through said tube, means for maintaining said acceleration grid at a steady positive potential with respect to said cathode to produce a concentrated electron space charge adjacent to said second control grid, means for impressing alternating potential from said first source upon said first control grid, resonant impedance means connected between said second control grid and said cathode, whereby said second control grid is excited by said alternating potential substantially by electron coupling with said space charge, the relative frequency of said source with respect to the resonant frequency of said impedance means being varied, a second electron tube having at least a cathode and an anode energized by said space current source, load impedance means in the anode circuits of both said tubes, and a direct current indicator connected between such points in the anode circuits of said tubes that the steady currents therethrough are balanced 5. A frequency deviation meter comprising a source of alternating potential, an electron discharge tube having a cathode and an anode, a first control grid near said cathode, a second control grid near said anode and an acceleration grid located between said first and second control grids, a source of space current connected to said cathode and anode for producing an electron discharge stream through said tube, means for maintaining said acceleration grid at a steady positive potential with respect to said cathode to produce a concentrated electron space charge adjacent thereto, means for impressing alternating potential from said first source upon said first control grid, resonant impedance means connected between said second control grid and said cathode whereby said second control grid is excited by said alternating potential substantially by electron coupling with said space charge, the relative frequency of said alternating potential with respect to the resonant frequency of said impedance means being variable, a second electron tube having at least a cathode and an anode energized by said space current source, direct current load impedance means in the anode circuits of said tubes, means for controlling the anode current of at least one of said tubes to equalize the steady potentials developed at the anodes of said tubes, and a direct current indicator connected between the anodes of said tubes 6. A frequency variation response circuit comprising a source of alternating potential, a pair of electron discharge tubes each having a cathode, a first control grid near the cathode, a second control grid, an electron acceleration grid between said first and second control grids and an anode, means for anti-phaseally impressing alternating potential from said source upon the first control grid of one of said tubes and upon the second control grid of the other tube, respectively, a resonating impedance means connected to both the remaining control grids and the cathodes of said tubes, a source of space current, load impedance means connected between the anodes of said tubes, a source of space current connected to a point of said load impedance means and the cathodes of said tubes, and means connected between the anodes of said tubes responsive to anode current changes due to relative frequency departure of the impressed alternating potential from the resonant frequency of said impedance means.

7. A frequency variation response circuit comprising a source of alternating potential, a pair of electron discharge tubes each having a cathode, a first control grid near said cathode, a second control grid, an electron acceleration grid between said first and second control grids and an anode, means for anti-phaseally impressing alternating potential from said source upon the first control grid of one tube and upon the second control grid of the other tube, respectively, a piezo-electric crystal element connected to both the remaining control grids and the cathodes of said tubes, a direct current impedance shunted across said crystal element, direct current load impedance means connected between the anodes of said tubes, a source of space current connected to a point of said load impedance means and the cathodes of said tubes, and means connected between the anodes of said tubes responsive to anode current variations due to relative frequency departure of the impressed alternating potential from the resonant frequency of said crystal element.

8. A frequency variation response circuit comprising a source of alternating potential, a pair of electron discharge tubes each having a cathode, a first control grid near said cathode, a second control grid, an electron acceleration grid located between said first and second control grids and an anode, means for antiphaseally impressing alternating potential from said source upon the first control grid of one of said tubes and upon the second control grid of the other tube, respectively, a piezo-electric crystal element connected to both the remaining control grids and the cathodes of said tubes, direct current load impedance means connecting the anodes of said tubes, a source of space current connected to a point of said load impedance means and the cathodes on the other hand, means for controlling the ratio of steady anode currents through said tubes, and means connected between the anodes of said tubes responsive to anode current variations due to relative frequency departure of the impressed alternating potential from the resonant frequency of said crystal element.

9. A frequency variation response circuit comprising a source of alternating potential, resonant impedance means, the relative frequency of said source with respect to the frequency to which said impedance means is resonant being variable, an electron discharge tube comprising a cathode, a first control grid near said cathode, a second control grid, an electron acceleration grid located between said first and second control grids and an anode, means for impressing alternating potential from said source upon one of said control grids, means for connecting said impedance means to said other control grid and cathode, direct current load impedance means inserted in the circuits of said acceleration grid and said anode, and means responsive to direct current variations connected between points in the anode and acceleration grid circuits carrying equal potentials due to the steady electron current components.

10. A frequency variation response circuit comprising a source of alternating potential, a piezo-electric crystal element, the relative frequency of said source with respect to the resonating frequency of said crystal element being variable, an electron discharge tube comprising a cathode, a first control grid near said cathode, a second control grid, an electron acceleration grid located between said first and second control grids and an anode, means for impressing alternating potential from said source upon one of said control grids, means for connecting said crystal element to said other control grid and cathode, direct current impedance means shunting said crystal element, direct current load impedance means inserted in the acceleration grid and anode circuits of said tube, and a direct current indicator connected between points of the acceleration grid and anode circuits carrying equal potential due to the steady electron current components.

11. A frequency variation response circuit comprising a source of alternating potential, a piezo-electric crystal element, the relative frequency of said source with respect to the resonating frequency of said crystal element being variable, an electron discharge tube comprising a cathode, a first control grid near said cathode, a second control grid, an electron acceleration grid located between said first and second control grids and an anode, direct current impedance means shunting said crystal element, direct current load impedance means inserted in the acceleration grid and anode circuits of said tube, means for varying the ratio of steady currents to said anode and acceleration grids, and means responsive to direct current variations connected between points of the anode and acceleration grid circuits carrying equal potential due to the steady electron current components.

12. A frequency variation response circuit comprising a source of alternating potential, an electron discharge tube having at least a cathode, an accelerating electrode and a pair of decelerating electrodes located on either side of said accelerating electrode, a source of high potential for maintaining said accelerating electrode at a steady positive potential with respect to said cathode to produce a concentrated electron space charge adjacent to said decelerating electrodes, resonant impedance means, the relative frequency of said alternating potential with respect to the resonant frequency of said impedance means being variable, means for impressing alternating potential from said first source between one of said decelerating electrodes and said cathode, further means for connecting said resonant impedance means between the other decelerating electrode and said cathode, whereby said last decelerating electrode is excited by said alternating potential by electron coupling with said space charge, an output circuit for said tube, means in said output circuit responsive to current variations in accordance with the relative frequency departure of said alternating potential from the resonant frequency of said impedance means, and further means energized by said high potential source for producing a current through said response means to compensate the steady output current therethrough.

13. A frequency variation response circuit comprising a source of alternating potential, resonant impedance means, the relative frequency of said source with respect to the resonant frequency of said impedance being variable, an electron discharge tube comprising a cathode, a first control grid, a second control grid, an acceleration grid located between said first and second control grids, and an anode, means for impressing alternating potential from said source upon one of said control grids, means for connecting said impedance means to said other control grid and cathode, direct current impedance means inserted in the circuits of said acceleration grid and said anode, and means connected between points of equal steady potential in the anode and acceleration grid circuits responsive to anode current changes in accordance with relative frequency departure of the impressed alternating potential from the resonant frequency of said impedance means.

HENRY M. BACH.